United States Patent [19]

Shirley, Jr.

[11] 4,213,924
[45] Jul. 22, 1980

[54] GRANULATION AND COATING BY IMPROVED METHOD OF HEAT REMOVAL

[75] Inventor: Arthur R. Shirley, Jr., Florence, Ala.

[73] Assignee: Tennessee Valley Authority, Muscle Shoals, Ala.

[21] Appl. No.: 916,988

[22] Filed: Jun. 19, 1978

Related U.S. Application Data

[63] Continuation-in-part of Ser. No. 850,588, Nov. 11, 1977, now Defensive Publication No. T980,005.

[51] Int. Cl.² .............................................. B01J 2/12
[52] U.S. Cl. .......................................... 264/7; 264/14; 264/117
[58] Field of Search .......................... 264/5, 7, 14, 117

[56] References Cited

U.S. PATENT DOCUMENTS

T980,005  3/1979  Shirley, Jr. ............................... 264/7
3,231,413  1/1966  Berquin ..................................... 264/7
3,682,569  8/1972  Vagin et al. ........................... 264/117

Primary Examiner—Donald J. Arnold
Assistant Examiner—James R. Hall
Attorney, Agent, or Firm—Robert A. Petrusek

[57] ABSTRACT

An improved process for the granulation or coating of hygroscopic or nonhygroscopic materials where melt is sprayed onto cascading granules of common or uncommon substrate in an enclosed vessel, and where the heat given off by solidification of the melt is absorbed by evaporation of water. The water is atomized into the granulator as an extremely fine mist and evaporation is effected without impingement of mist on granules or granulator internals. An equation is developed which mathematically represents the thermodynamics of the process and specific values are presented for variables when granulating sulfur or urea.

7 Claims, 3 Drawing Figures

FLOW DIAGRAM OF THE MELT GRANULATION PROCESS
WITH HEAT REMOVAL BY RAPID EVAPORATION OF WATER MIST

GRANULATION AND COATING BY IMPROVED METHOD OF HEAT REMOVAL

The invention herein described may be manufactured and used by or for the Government for governmental purposes without the payment to me of any royalty therefor.

This application is a continuation-in-part of application Ser. No. 850,588, filed Nov. 11, 1977 now Defensive Publication No. T980,005, published Mar. 6, 1979, for GRANULATION AND COATING BY IMPROVED METHOD OF HEAT REMOVAL.

The present invention relates to an improvement in melt granulation processes wherein the heat of crystallization and associated heat from cooling of the melt and subsequently solid material must be dissipated in some manner, and more specifically it relates to a new concept in heat removal for melt granulation processes which will allow more efficient operation. In most cases, the techniques can be applied also to encapsulation and coating processes. The process, procedures, and equipment of the invention apply to granulation of hygroscopic materials as well as those which are nonhygroscopic.

In particular, this invention relates to granulation in an enclosed vessel, such as a rotating drum or hooded pan granulator, wherein air is or can be ventilated through said vessel, and wherein said air does or can be made to come in contact with the material being granulated and/or the wall or internals of the vessel which come in contact with the materials such that the air can be used to either directly or indirectly transfer heat from the material which is solidifying and cooling.

One of the classical methods of granulating is gas prilling where droplets of molten material are formed by any number of means and are allowed to fall through tremendous volumes of gas flowing countercurrent to them. Heat is removed by the flowing gas allowing the granules to solidify. Such processes are described by Williams et al (U.S. Pat. Nos. 2,402,192 and 2,774,660) where a 95 percent aqueous solution of ammonium nitrate and a molten, substantially anhydrous, ammonium nitrate were the sprayed materials. Gas prilling is now one of the foremost granulation processes worldwide, but it has many disadvantages, one of which is the tremendous amount of cooling air required. Also, the cost of construction for this type of plant is high. Prills are inherently small and for most materials contain voids and/or surface dimples.

Other researchers have disclosed methods of reducing the tremendous volume of countercurrent gas flows in shot towers by external cooling loops such as that of J. E. Jewett et al (U.S. Pat. No. 1,837,869) where the gas is passed through a cooler supplied with cooling coils in which a brine solution circulates and precools the air before it enters the shot tower, thus in effect reducing somewhat the size of tower and quantity of cooling air required, but at the expense of installing external coolers.

In further similar disclosures, Ishizuka et al (U.S. Pat. No. 3,058,159) and Klopf (U.S. Pat. No. 3,231,640) advocated introducing water in the form of spray or mist in the incoming air at the bottom of the shot tower. The water droplets would be small enough to be carried up the shot tower and evaporate as they come into contact with the larger falling particles of granulating material. However, because of the direct contact of the water droplets and the solidifying particles this method of heat removal is not practical for my process where it is desirable that the product be discharged from the shot tower dry, such as in sulfur granulation; where the granulating material is hydroscopic, such as in urea granulation; or where direct contact of water and granules is prohibited for any reason chemical or physical. For those knowledgeable in the art it is obvious that the teaching of Jewett et al, Ishizuka et al, and Klopf could be combined such that precooling is done by evaporation of water external of the shot tower such as in a humidifying chamber and then introduced to the tower as a somewhat precooled humid air free of water mist. Those knowledgeable in the art will also know that precooling by this nature is limited severely in humid climates and almost useless when granulating hydroscopic products such as urea. My disclosure, in fact, does not attempt to reveal how water can be continuously evaporated in a shot tower type unit in order to drastically decrease the amount of gas handled, decrease the size of the equipment, or make the process more operational. It is believed however that those skilled in the art can improve on my work to the point that disclosures can be made on how cooling by continuous water evaporation can be made to work in gas prilling type units like shot towers.

Invention disclosures were made by Bottai et al (U.S. Pat. No. 3,578,433) and Campbell (U.S. Pat. No. 3,334,159 and 3,550,195) among others, who advocated prilling into a liquid in which the prilled material was either insoluble or only slightly soluble. Bottai's invention involved prilling urea-ammonium polyphosphate in various liquid mediums. Campbell's disclosures involved prilling sulfur into water. These liquid cooling processes eliminated the use of gas and its associated problems but resulted in other problems. The prills retained a portion of the cooling medium which either had to be removed by other means, such as heating and drying, or had to be accepted as impurities in the product. Prills from liquid granulation were inherently small and still contained voids and/or surface dimples.

In U.S. Pat. No. 3,398,191 issued Aug. 20, 1968, Thompson et al disclose a granulation process in which urea seeds are charged to the bed formed in a rotary drum. As the drum rotates, flights raise the solid particles from the bed and shower them down throughout the cross section of the drum. Urea is sprayed onto the cascading granules to build the granules in size. Air is drawn countercurrent to the product flow through the cooling section of the drum and then to the granulating section. No supplemental cooling external of the rotary drum was used in the example given, but the text indicated that it could be employed as it was in the granulation of ammonium nitrate. In a somewhat similar disclosure in U.S. Pat. No. 3,877,415 issued Apr. 15, 1975, Blouin describes a rotary drum process for applying coating to solid particles in which, by example, he shows its effectiveness as a coating or granulating apparatus in spraying sulfur onto a substrate as it falls in a continuous curtain at a predetermined distance away from a number of spray nozzles. Blouin briefly proposes three possible ways of removing the heat given off by solidification of the sprayed material. Cooling gases could be passed through the granulating drum to directly contact the granules and absorb the heat; the material to be solidified might be sprayed in the form of a solution; and the evaporation of the solvent into a hot air stream could remove the heat of crystallization, or as he states, "by maintaining the particulate feed at a sufficiently low temperature that the resulting product emerges at a temperature below the fusion temperature of the coating medium." Those familiar with the art of granulation recognize that the latter can be done by recycling material through the drum while cooling the material external of the drum.

Rotary drum granulation processes make it possible to produce granules with improved physical characteristics over prilled materials, as is shown by example in the disclosure of Thompson et al. However, cooling is still a problem generally requiring the use of large quantities of cooling air or the recycle of large quantities of externally cooled granular material, both of which are expensive energy consuming ways of removing the heat associated with the granulation.

Sulfur slating as disclosed by Ellithrope and Fletcher in U.S. Pat. Nos. 3,885,920 and 3,838,973 allows the use of inexpensive cooling medium water without the inherent problems associated with water prilling. This process is one of the primary methods of sulfur granulation employed at present. However, the product resulting from this process is not resistent enough to breakage and abrasion to allow it to meet some air pollution and safety standards which will become effective in the near future.

Berquin discloses in U.S. Pat. No. 3,231,413 a granulation process using a modified fluidized bed whereby a liquefiable material is injected into an incoming fluidizing gas and results in the impaction of particles of the liquefiable material onto the fluidized granules, thus gradually building them in size. Berquin's disclosure teaches that water can also be injected into the gas flow along with the liquefiable material provided the liquefiable material is not hygroscopic. According to the disclosure, the water impinges on the flowing bed of granules where it is immediately vaporized as steam and maintains the gaseous flow stream at 100° C., thus removing heat from the process. Berquin specifically cites sulfur as nonhygroscopic material which can be granulated in this manner. Data as presented in Example IV infra indicate that sulfur granules have much better qualities when water is not allowed to come in direct contact with the surfaces of the granules as they are being formed.

Sulfur has been commercially granulated by the Berquin invention; whether or not these plants have used the evaporative cooling step is not known. Some sulfur processors considering the use of the Berquin process have considered it excessively expensive because of high electrical power consumption associated with the fluidized bed. The possibility of a sulfur explosion in a plant using the Berquin process is reported to be a source of concern to some considering its use.

In U.S. Pat. No. 3,936,534, issued Feb. 3, 1976, Schallis disclosed a blend of the rotary-drum granulation type process and water cooling. The water is atomized directly on a rolling bed which has no lifting flights as opposed to the disclosures of Thompson et al and Blouin. Sulfur is also fed directly to the bed and the heat of solidification and cooling is primarily removed by water cooling. Air is used to promote drying in some instances. Schallis' invention, however, like Berquin's water cooling disclosure, is suitable only for sulfur and other hydrophobic materials. Further, the granular sulfur made by the process of Schallis appears to be too weak and too friable to be useful for many uses in the sulfur industry (see Example IV, infra).

It is therefore an object of the present invention to provide a process which substantially reduces the problems associated with the aforementioned processes. The present invention provides a means of granulation whereby the heat removal can be done without contaminating the product by direct contact with a cooling liquid such as with the processes of Schallis, Campbell, Bottai, Ellithrope et al, Berquin, Ishizuka et al, Klopf, and others. It involves cooling without the use of massive amounts of air as disclosed by Thompson et al and Williams et al, and alluded to by Blouin. It does not require a tremendous amount of recycle as used in classical granulation processes, nor is it in any way limited to nonhydroscopic materials such as the processes of Schallis, Ishizuka et al, Klopf, and Berquin.

Further, it is an object of the present invention to produce granules which are hard, spherical, closely sized in a wide selection of sizes, and resistant to both impact and abrasion, and thus are at least as good a quality product as any product made using a process of the present art, and better than most.

A still further object of the present invention is to provide a means of granulation which will be safe and eliminate pollution problems of both air and water which exist with many present processes.

BRIEF DESCRIPTION OF THE INVENTION

According to the present invention, molten material is sprayed onto seed granules or another substance such as in an encapsulation process. The spraying takes place in an enclosed vessel, such as a rotary drum or hooded pan granulator, preferably with lifting flights, which allow maximum mixing of the granules and the atmosphere enclosed in the unit. Water is finely atomized into areas of the granulator which are not subtended by falling granules such that the water is allowed to quickly evaporate into the granulator's atmosphere without directly contacting the material being granulated. The heat of vaporization is taken from the air, thus cooling it; then the air contacts the granules and cools them. If a drum is used, air is pulled through it concurrently with the flow of granules and the moisture content of the air is regulated at values lower than the critical humidity of the granules and at values such that condensation will not take place in the air or on any of the internals of the granulator. Good mixing of air and granules in the granulator is essential to minimize the size of the granulator and maximize the production rate of the unit. Although it is obvious to those acquainted with the art of granulation that the process is well suited to batch type granulation, the examples which are given later in this disclosure refer specifically to a continuous process in which seed granules are continually fed to the unit, molten material is continually sprayed onto the seed granules, and product is continually discharged. Recycle of undersize granules is maintained to control the size of such granules and to aid in the cooling of the product by external cooling, if so desired. The particles leave as dry, hard, spherical granules of the size and range desired.

DETAILED DESCRIPTION OF THE INVENTION

Figure 1:
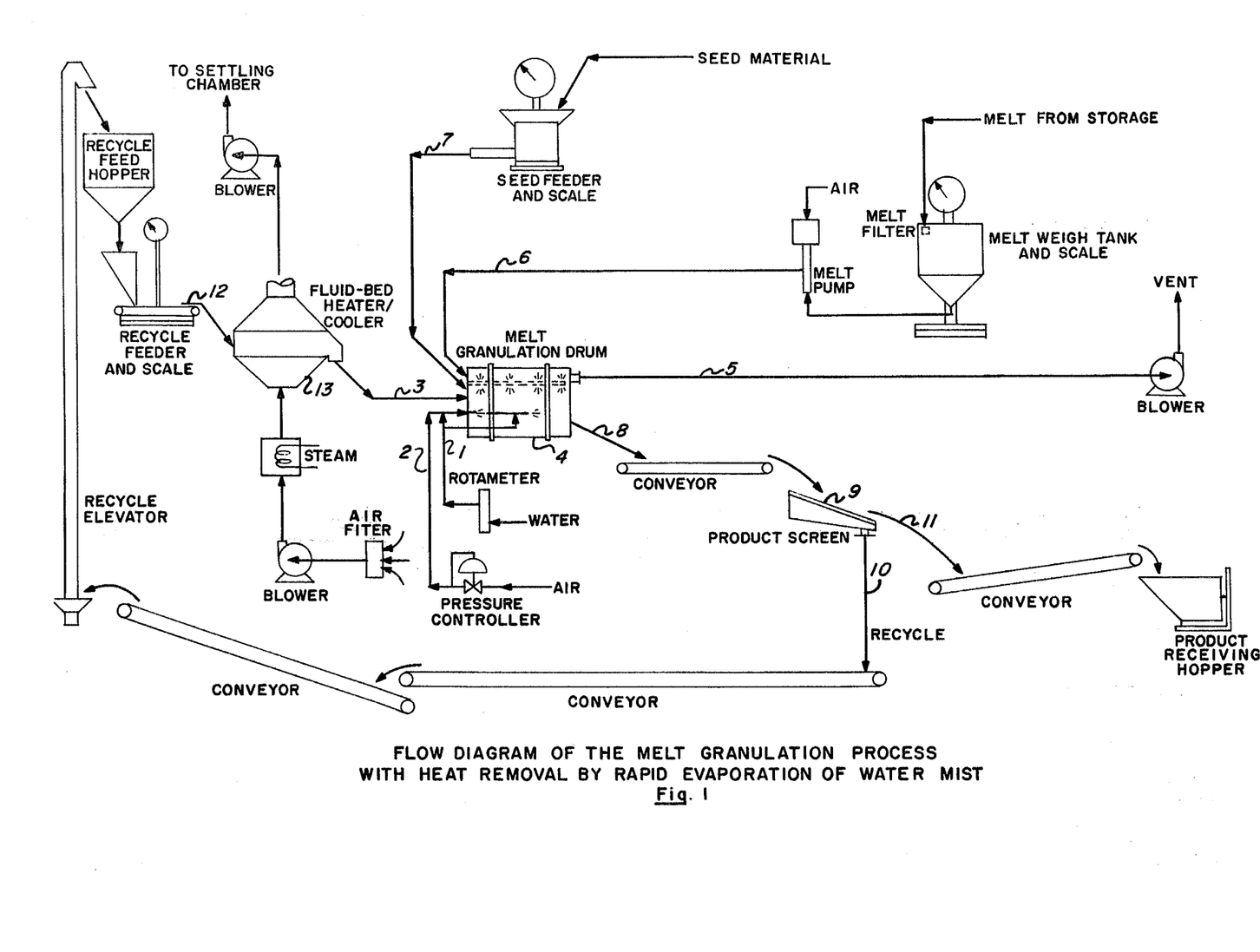
FIG. 1 is a process flow diagram for granulation by the process of the instant invention.

Referring now more specifically to FIG. 1 in the process of the present invention, water 1 is atomized to a fine mist by air 2, or other means of injection 3, into rotary drum 4 granulator. Air is pulled through the drum cocurrent with the flow of granules 5. (Those acquainted with the art of psychrometrics will recognize that the invention is still operational if the air is pulled countercurrent to the solids flow; however, if some cooling is done by recycle of solids such that recycle is below the normal granular temperature in the drum, the allowable moisture content in the air will be less to prevent condensation on the cooler incoming recycle.) As the water mist evaporates into the air, the heat of vaporization removes the heat of fusion of the molten material which is solidifying in the drum. The molten material is also sprayed 6, but at much less degree of atomization and in a manner that it comes in contact with granules existing in the drum such that it solidifies as a thin film on these granules. In contrast to the inventions of Schallis and Berquin, it is the intent of this invention to keep the water mist away from the granules and the sprays of molten material such that water does not impinge on the granules nor the sprays of molten material or in any manner come in direct contact with either of them. It is also the intent of this invention that the humidity of the air as it flows through the drum not be allowed to get above the critical humidity of the product being granulated, nor should the wet-bulb temperature of the air anywhere in the drum be allowed to reach a temperature at which condensation would occur on any of the internals in the granulator. Seed granules of sulfur made by any means are fed on a controlled basis into the front end of rotary drum 7. Material discharging from drum 8 is screened 9 and the undersize portion is returned to drum 10 as recycle material and the onsize is product 11, It is recommended that the rate of recycle be controlled 12 to give a stable process and to provide the product with the most desirable physical characteristics. The recycle may be either cooled or heated 13, or returned to the granulating drum at the same temperature it discharged with depending on other process considerations. In certain processes, agglomeration may occur in the granulator. In these processes, the oversize may be crushed and returned to the granulator as seed or recycle material, or it may be melted and returned to the granulator through the spray nozzles.

The granulation can take place in a rotary drum with a classical tumbling bed where the material is sprayed directly onto the bed, or it may take place in any number of other designs such as that discussed by Thompson et al, or Blouin. The action of the granules should be sufficient to provide rapid movement past the nozzles spraying the molten material and the droplets of molten material should be atomized finely enough that the formation of agglomerates in the granulation drum is minimized.

Figures 2, 3:
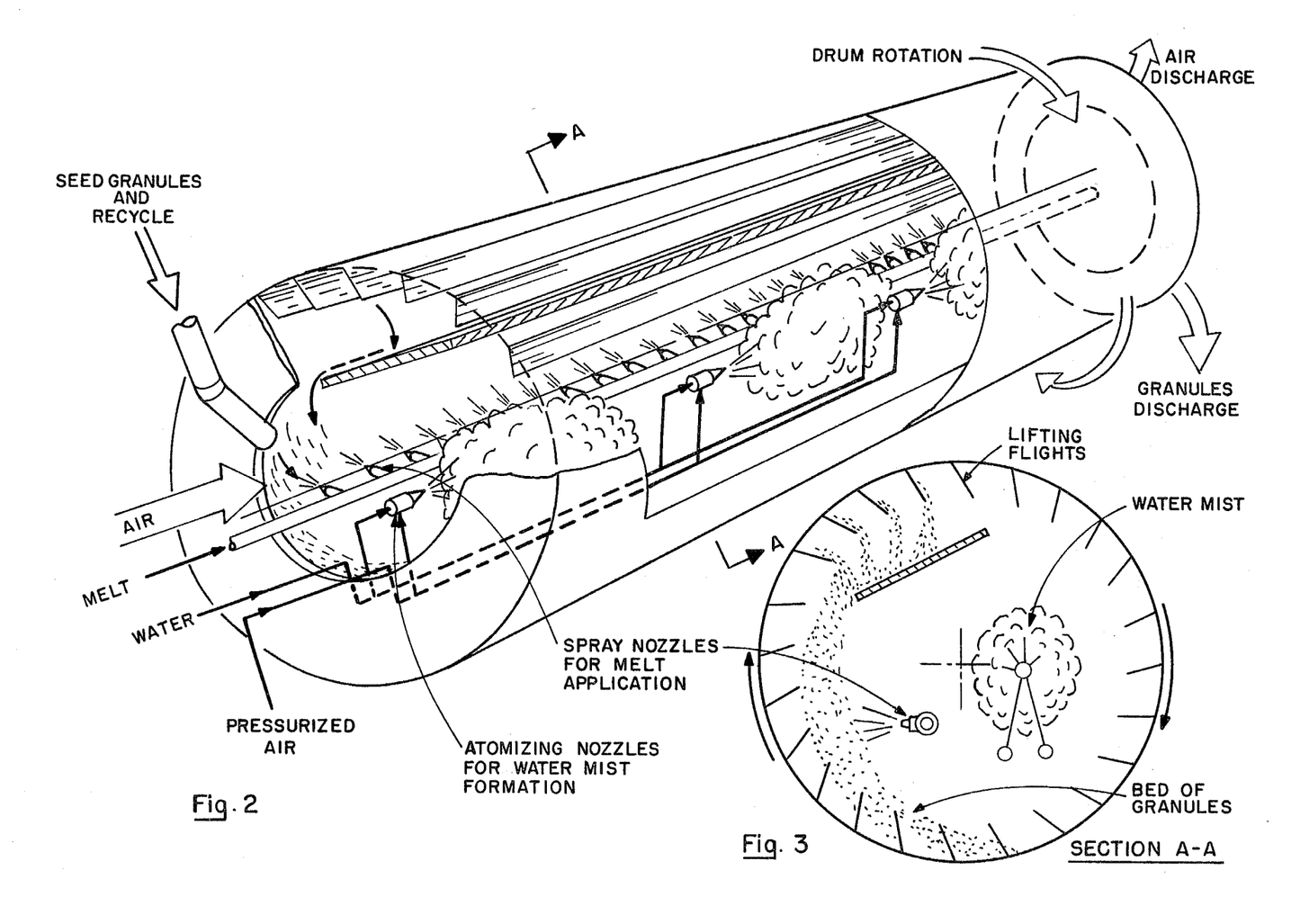
FIG. 2 is a pictorial view of the granulating device showing the relative positions of the water atomizing nozzles.
FIG. 3 is a feed-end view of the granulating device showing the relative positions of the water atomizing nozzles taken through Section A—A of FIG. 2.

Referring more specifically to FIGS. 2 and 3 a rotary drum with 24 lifting flights equally spaced on its inside shell was used as the granulator. The flights were 3 inches wide and 6 feet long. A deflector pan 20½ inches wide and 6 feet long and suspended at an angle of 35 degrees from the horizontal as seen from the end of the drum (as described in Blouin patent) was used. The deflector plate described by Blouin was not used. (Blouin's apparatus makes an excellent granulator for use with the present invention, but the invention is certainly not limited to its use. There are certain features of Blouin's apparatus which enhance the process however. For example, the deflector pan forms a roof over a portion of the inside of the drum under which the water atomizing nozzles can be placed.) In the tests, the nozzles were oriented to spray parallel to the drum's axis cocurrent with the airflow. However, the practitioner of this invention will find that in some applications the orientation of the nozzles may be directed in a different direction without departing from the spirit or intent of the present invention. The flights which were flat were canted 15 degrees forward from the perpendicular to the shell of the drum to give the desired lifting characteristics. The drum used was 4 feet in diameter and 6 feet long. Molten material was atomized onto the falling granules as described in the Blouin patent, supra.

In many cases, existing granulation plants as well as future plants can make use of this unique evaporative cooling process of my invention which will allow substantial changes in present granulation technology, such as significant reductions in cooling air, reduction or elimination of recycle and supporting coolers, screens, and refrigeration systems. In doing this, the capital cost of a granulation plant will be lowered. Energy requirements will be reduced as a result of handling less recycle and less cooling air. Dust generation will be less, and subsequently, recovery of potential pollutants will be much easier. Alteration of many prior-art granulation units will be simple, such as removing all or a number of the lifting flights or reversing their lift angle. This in some cases will result in major increases in production capacity with no increase in energy consumption or plant equipment while improving process control and producing a product with better and more uniform characteristics.

THEORY OF THE INVENTION

It is important that evaporation of the water introduced into the drum in the form of mist be rapid to prevent impingement on internal surfaces of the granulator or granules, and at the same time, it is important to maximize the evaporation rate, since this is analogous to the rate of heat absorption by the droplets of water.

The evaporation rate from a single water droplet under quiescent conditions can be mathematically represented in mass transfer terms by the classical equation:

$$-dm/d\theta = k_g A \pi r^2 (y_i - y) \qquad (1)$$

where $$k_g = DP/RTr \qquad (2)$$

In the first equation $-dm/d\theta$ is the instantaneous rate of evaporation, r is the radius of the droplet, $y_i$ and y are the mole fractions of the evaporating water in the air at the interface of the droplet and air, and in the airstream at a large distance from the droplet, respectively, and $k_g$ is the mass-transfer coefficient. In the second equation, D is the diffusion coefficient, P is air pressure in the drum, R is the universal gas constant, T is the absolute temperature of the gas, and r is again the radius of the droplet.

In the process of the instant invention, the air pressure in the drum remains essentially constant. The absolute temperature varies only slightly and its effect on viscosity and therefore diffusion is also very slight. Thus, the instantaneous rate of evaporation of a droplet of given mass and size is primarily controlled by and is directly proportional to the magnitude of the difference in moisture concentration at the droplet's interface with the air and that of the air at a large distance from the droplet.

For any given size droplet, the time required for evaporation is determined by integrating equation (1) to get the classical equation $$\theta = \frac{\rho r_o^2 RT}{2MDP(y_i - y)} \tag{3}$$

where $\rho$ is the density of water, $r_o$ is the original radius of the droplet before evaporation, M is the molecular weight of water, and $\theta$ is the time it takes the droplet to evaporate.

Those familiar with the air of heat transfer know that the evaporation rate of the water droplet can also be given in terms of heat transfer by the classical equation $$-dw/d\theta = \frac{4\pi k_f r(t_a - t_w)}{\lambda} \tag{4}$$

where $-dw/d\theta$ is the instantaneous evaporation rate, $\lambda$ is the latent heat of water at temperature $t_w$, $t_w$ is the temperature of the water particle, $t_a$ is the air temperature, $k_f$ is the thermal conductivity of air, and r is the radius of the droplet. Equation (4) shows the same relationship of the droplet size with the evaporation rate as equation (1) (when the values of $k_g$ given in equation (2) are substituted for $k_g$ in equation (1)), but since it is written in terms of heat transfer, the temperature gradient replaces the concentration gradient as the driving force when the droplet is considered to be of a given size. It is seen that evaporation rate is directly proportional to the radius of the droplet in both equations (1) and (4) (when the values of $k_g$ given in equation (2) are substituted for $k_g$ in equation (1)).

The life of a given droplet can be obtained again by integration of equation (4) to give the classical equation $$\theta = \frac{\lambda \rho r_o^2}{2k_f(t_a - t_w)} \tag{5}$$

where $\rho$ is the density of water, and $r_o$ is the original radius of the droplet. Equations (3) and (5) show that the time of evaporation required by a single droplet is directly proportional to the square of the radius of that droplet.

If a given droplet is divided to form "n" number of droplets each of the same size and whose accumulative mass is the same as the mass of the original, then it can be shown mathematically that $$r_n = r_1/n^{\frac{1}{3}}, \text{ or } r_1 = n^{\frac{1}{3}} r_n \tag{6}$$

where $r_n$ is the radius of each of the small droplets and $r_1$ is the radius of the larger droplet.

To determine the increase in evaporation rate of a droplet divided into "n" smaller droplets, the evaporation rate of a small droplet can be determined by equation (4) where r is $r_n$, then the summation of the evaporation rate of each droplet gives the total evaporation rate.

$$\sum_1^n - dw_{n/d\theta} = \frac{n[4\pi k_f r_n(t_a - t_w)]}{\lambda} \tag{7}$$

where $-dw_n/d\theta$ is the instantaneous evaporation rate of any single droplet.

If $r_n$ is replaced by $r_{1/n^{\frac{1}{3}}}$ as in equation (6), it is seen that $$\sum_1^n - dw_{n/d\theta} = \frac{n^{\frac{2}{3}} 4\pi k_f r(t_a - t_w)}{\lambda} \tag{8}$$

The cumulative instantaneous evaporation rate of a droplet split into "n" smaller droplets can be compared with the evaporation rate of that droplet as a whole by comparing equation (4) where r is $r_1$ with equation (8) and it is seen that $$\sum_1^n dw_{n/d\theta} = n^{\frac{2}{3}} dw_1/dO \tag{9}$$

thus by breaking a larger droplet into smaller droplets, the instantaneous evaporation rate of the mass is increased by $n^{\frac{2}{3}}$.

Following a similar mathematical procedure with equation (3) or (5), it can be shown that $$\theta_n = \theta_1/n^{\frac{2}{3}} \tag{10}$$

thus by breaking a larger droplet into smaller droplets, the time of evaporation is decreased by $n^{\frac{2}{3}}$.

The droplets in equation (7) are not under quiescent conditions as previously indicated but are dependent on forced convection as well as thermal conduction and the water normally enters the granulator at a temperature other than that at which it evaporates, thus equation (7) can be written $$(-dw/d\theta)_t = \frac{n4\pi \bar{r}(k_f + k_c)(t_a - t_w)}{\lambda + \Delta h_w} \tag{11}$$

which approximates the total instantaneous evaporation rate in the granulator, $(-dw/d\theta)_t$ when $\bar{r}$ is the average radius of the droplets during their lifetime; and provided the temperature of the water entering the granulator is only slightly different from the temperature at which it evaporates. It can be mathematically shown that $\bar{r}$ is $\frac{2}{3} r_o$ where $r_o$ is the original radius of the droplets sprayed into the granulator; $k_c$ is the average forced thermal convection of air in contact with water droplets resulting from turbulence in the granulator; and $\Delta h_w$ is the change in enthalpy of the water before vaporization begins. (The addition of these terms to equation (7) does not affect the relationships expressed in equations (9) and (10).)

Equation (11) can be written in terms of heat-transfer rate $$dQ_e/d\theta = n4\pi\bar{r}(k_f + k_c)(t_a - t_w) \quad (12)$$

To completely describe the heat absorbed from the solidifying melt in the granulator, the heat absorbed by the change in enthalpy of the ventilating air and evaporated moisture $$dQ_a/d\theta = W_a \Delta H_a \quad (13)$$

$$dQ_v/d\theta = W_v \Delta H_v \quad (14)$$

should be added to equation (12) to give the total heat absorption rate in the granulator as follows:

$$dQ_t/d\theta = n4\pi\bar{r}(k_f+k_c)(t_a-t_w) + W_a\Delta H_a + W_v\Delta H_v \quad (15)$$

where W and $\Delta H$ are the mass flow rate and change in enthalpy for air and water vapor, and $dQ_t/d\theta$ is the total heat absorption rate.

The above equations describe the flow of mass and heat as they refer principally to the evaporation of water which is the coolant of this process. However, heat must be removed from the granule being built to completely describe the cooling action of this process. This is done by the following classical equation $$dQ_t/d\theta = hA(t_g - t_a) + q_i \quad (16)$$

where $dQ_t/d\theta$ is the heat transfer rate from granules to air, h is the heat transfer coefficient from granules to air, $t_g$ is the average temperature of the granules over the length of the drum, $t_a$ is the average temperature of the air over the length of the drum, and A is the surface area of granules exposed to the air, and $q_i$ is the flow of heat from the granules to the air via an indirect means such as conduction and radiation to the drum shell and its internals and then conduction and convection to the air. (Losses through the drum shell are not considered.)

The heat-transfer coefficient, h, and the area of the granules exposed to the air for heat transfer, A, are both highly dependent on the type and size of granulator used and equation (16) is better written by replacing them as follows:

$$dQ_t/d\theta = h_g N_g A_g(t_g - t_a) + q_i \quad (17)$$

where $h_g$ is the average heat-transfer coefficient between granules and air in the granulator and is based on the type of granulator and its mode of operation, $N_g$ is the average number of granules exposed to the air at any one instant and $A_g$ is the average surface area of each one of those granules exposed to the air.

Then equations (15) and (17) can be equated to completely describe the heat transfer in a granulator using my invention.

| | Heat absorbed by: | | |
|---|---|---|---|
| Heat from solidification and cooling of melt | = Evaporation | + Air | + Water vapor |
| $h_g N_g A_g(t_g - t_a) + q_i$ | = $n4\pi\bar{r}(k_f + k_c)(t_a - t_w)$ | + $W_a\Delta H_a$ | + $W_v\Delta H_v$ (18) |

Rewriting:

$$1 = \frac{n4\pi\bar{r}(k_f + k_c)(t_a - t_w) + W_a\Delta H_a + W_v\Delta H_v}{h_g N_g A_g(t_g - t_a) + q_i} \quad (19)$$

The overall local temperature difference $\Delta t_1$ between the hot granules and the wet-bulb temperature of the air is the sum of the driving force for evaporation of the water droplets and heat transfer from granules to air.

$$\Delta t_1 = (t_g - t_w) = (t_g - t_a) + (t_a - t_w) \quad (20)$$

Using the above equations, the theory behind my invention can be fully discussed. Provided all other variables are constant, equation (19) shows the rate of heat transfer is directly affected by temperature. Every molten material which can be granulated has an upper temperature limit, $t_g$, which must not be exceeded. Above this temperature, granulation will not take place. On the low side, $t_w$, which completes the definitions of $\Delta t_1$, the temperature is that of the water droplets as determined by the temperature and humidity of the air. The temperature of the air, $t_a$, is common to numerator and denominator. With a granulation system at equilibrium and all other variables of equation (19) fixed conditions, any decrease in $\Delta t_1$ will decrease the overall heat transfer. Since both are equations of the overall heat transfer rates in a system at equilibrium, any decrease in $\Delta t_1$ will reduce numerator and denominator equally. If other variables specified in equation (19) change, then the temperature of the air in the granulator, $t_a$, will shift decreasing for increased values of the numerator and increasing for increased values in the denominator and vice versa. In the case where the other variables increase the overall heat transfer rate increases, where they decrease the overall heat transfer rate decreases.

For those knowledgeable in the art of heat transfer, it is easily recognized that for this process rotary drums which lift material out of the tumbling bed and allow it to freefall through air such as the drums used by Thompson et al, or Blouin, are much more effective than a simple unflighted drum as used by Schallis because they provide more contact area ($A_g N_g$) with the air by showering the granules through it. Further, flat-bladed lifting flights appear to be better than those of Thompson et al or Blouin, as they act as better blower blades swirling maximum amounts of air for increased contact of air and falling granules. This type of increased contact of air and granules increases $h_g$ as we defined it and thus the rate of heat transfer between granules and air. As a result, the temperature balance will shift to increase the overall heat transfer rate between granules and evaporating water.

As the granules grow, the surface area per granule becomes larger; however, the number of granules per unit weight decreases. In drums of Blouin's and Thompson's designs, this decreases the overall heat transfer rate because although the granules lifted and discharged into the air contain more surface area per granule, there are fewer of them and surface area available for heat transfer is less per unit weight of material lifted.

The indirect heat flow $q_i$, is dependent primarily on the surface area of the drum and its internals. Drums of Blouin or Thompson et al designs have higher $q_i$ values than unflighted ones with a smooth shell.

The thermal conductivity of air, $k_f$, increases with increasing temperature and decreases with increasing humidity, but neither change is of major consequence.

The forced thermal convection of the air, $k_c$, varies with type of drum and spray nozzle used and can vary greatly depending on the choice.

The remaining terms in the lefthand side of the numerator of equation (19), $n\bar{r}$, are both functions of the water spray rate. If the rate is fixed and is represented by $r_t$ (the radius of a single droplet which could contain the total mass) over a differential time, then the more actual drops this mass can be divided into the faster the evaporation rate. Since the rate of evaporation varies by the number of droplets to the $\frac{2}{3}$ power, supra, droplet number or consequently droplet size for a given spray rate is truly significant, e.g., doubling the droplets for a given spray rate increases the evaporation rate by 1.59 times and reduces the life of the droplet by 1.59 times. Changing the droplet size is engineeringly an easy way to increase evaporation rate and overall heat transfer rate in this type of granulation system. Water droplets normally known in weather classification as drizzle are considered to be about 200μ in diameter and would be considered a good spray in many processes. With proper nozzle design, it is possible to spray water in the 10μ range. This would have the effect of increasing the number of droplets by 8000 times, increasing the evaporation rate 400 times (provided other conditions remained constant), and decreasing the evaporation time of the droplets by 400 times. The latter being important to prevent impingement of water on the granules or internals of the granulator. It can easily be seen that by increasing atomization, most of the heat transfer driving force ($\Delta t_1$) can be shifted to the denominator of equation (19) to increase the heat transfer rate from granules to air and increase the overall heat transfer rate to the same extent. The overall heat transfer rate can also be increased by increasing airflow through the drum, as shown by the middle term of the numerator, but vice versa, by increasing the lefthand side of the numerator the airflow can be reduced along with its supporting equipment.

The righthand term of the numerator is dependent on the amount of water sprayed and as such is dependent on the evaporation rate of the lefthand side of the numerator.

The following examples show how the present invention has taken the above concepts and developed them into the unique method of granulation of molten material.

EXAMPLE I

The granulation system described earlier using a granulator of Blouin's design was used to test my unique invention. As the granulation drum revolved, lifting flights continuously discharged material onto a deflecting pan which gathered the granules together and discharged them in a falling cascade on which molten sulfur was sprayed at 274° F., through six hydraulic nozzles mounted 5½ inches from the cascade, with a spraying pressure of 300 psig, and at an overall rate of 1944 pounds per hour. The cooling and ventilating air entered the feed end of the drum at 84° F. and discharged at the other end at 112° F. The flow rate of air was measured to be between 400 and 600 acfm. Cooling water at 70° F. was pneumatically atomized into the drum at the feed end at the rate of 55.6 pounds per hour using a model 26 spray nozzle manufactured by Spraying Systems Company. The 60-psig air atomized the water to a median diameter of about 50 to 60 microns with a maximum droplet size of about 90 microns. The droplets appeared to evaporate in about 1 second. The nozzle was aimed to spray parallel to the sulfur header, toward the discharge end of the drum, and at the approximate center point of the area between the sulfur header, deflecting pan, and sides of the rotating drum; this position prevented the atomized spray of water from impinging on any surface including that of the sulfur granules. Sulfur granules, 89 percent less than −8 mesh, Tyler sieve size, were continuously metered into the granulating drum at 22 pounds per hour to provide the seed for granulation. The granulated sulfur discharged from the drum at 170° F. and a rate of 2820 pounds per hour, and was carried by belt conveyor to a single-deck screen which separated product and undersize. All granules which were +4 mesh by Tyler sieve size, about 1980 pounds per hour, were discharged as product; all undersized material was conveyed to a recycle feed hopper from which they were metered to a fluid-bed unit at about 840 pounds per hour. The recycle granules were cooled to 92° F. before overflowing into the granulation drum for further buildup. It was calculated that 82,200 Btu's per hour had to be removed from the process with 59,600 Btu's per hour being removed by evaporating water and the rest by heatup of the ventilating air and external cooling of the recycle.

The product produced had excellent physical features; 95.6 percent $-\frac{3}{8}+4$ mesh by Tyler sieve size, 22.4 pounds per granule average compression strength, 1.0 percent degradation by TVA's standard abrasion test, 0.04 moisture by Karl Fischer procedure; no agglomeration of granules was evident.

EXAMPLE II

To show by example that no recycle cooling is needed in a granulation process using this unique system of water evaporative cooling, the recycle stream was heated in the fluid-bed unit to 183° F. and overflowed into the coating drum. Temperature of the granules leaving the granulation drum was maintained at 176° F., slightly higher than in Example I, supra. Flow rates of all streams were about the same as in Example I, supra, as were other temperatures except ventilating air discharging from the coating drum. The water sprayed into the granulator was atomized to a median diameter of 50 to 60 microns. It was calculated that 80,500 Btu's per hour had to be removed from the process with 59,700 Btu's per hour being removed by evaporating water and the rest by heatup of the moisture laden ventilating air.

EXAMPLE III

To show the example the difference in recycle requirements if no evaporative cooling is done, granulation was done in the same equipment and manner as in Examples I and II, supra, except the undersize recycle rate was increased 7.7 times to 6450 pounds per hour. The recycled granules were cooled to 104° F. by the fluid-bed unit as in Example I, supra. Flow rates of all other streams were similar to Examples I and II, supra, including the product rate which was approximately 1890 pounds per hour. The product discharge temperature was 156° F. It was calculated that 88,900 Btu's per hour of heat had to be removed. The recycle stream removed 70,200 Btu's per hour and the ventilating air removed the rest. Because of the higher recycle rate, the product was much closer sized than in Example I, 97.9 percent $-3+4$ mesh by Tyler sieve size; degradation was about the same at 1.3 percent; as was moisture content at 0.03 percent, but average compression strength was much lower at 13.4 pounds per granule. Heat removal in this example could have been done with a recycle of about 5100 pounds per hour had temperatures of the exit product been allowed to increase to that experienced in Examples I and II. By comparison with Example I, supra, it is demonstrated that for every pound of water atomized and evaporated in the drum, 77.6 pounds of recycle can be eliminated. Energy consumption in product handling varies with the product weight and size, and the distance and lift it must be given; therefore, it is impossible to state how much can be saved in any given granulation by using nozzles to atomize water droplets to a median diameter of 60 microns or less in the granulating drum. Where recycle or product is cooled external of the granulating drum in a drum-type unit as in many processes, those familiar with the art can really see that increased cooling can be obtained by injecting finely atomized water into the air at various intervals as in the granulating drum. Since no heat fusion is being given off to maintain the granules at a high temperature, the heat transfer rate may be lower than in a granulator. A countercurrent flow of air instead of concurrent flow as recommended in the granulation units will give maximum efficiency and reduce the chance of control problems leading to condensation of water on the internals of the drum or the surface of the granules.

EXAMPLE IV

To show by example the effect of letting water impinge on the granulating material, such as Schallis, Ishizuka et al., Klopf, and Berquin advocate, the granulation process described in Example I supra was repeated with the exception that approximately 5 pounds per hour of the 59 pounds per hour of water which was sprayed was allowed to come into contact with the rolling bed of sulfur granules to allow some cooling by surface evaporation. This water was applied by a second spray nozzle. The water caused significant operational problems including sticking on granulator surfaces, sluggish flow of granules in the granulator, serious agglomeration of granules, and granules with much poorer physical features; 89.9 percent $-\frac{3}{8}+4$ mesh by Tyler sieve size, 11.2 pounds per granule average compression strength, 11.3 percent degradation by TVA standard abrasion test, 0.04 moisture by Karl Fischer procedure.

EXAMPLE V

Urea is a hygroscopic compound which readily absorbs moisture from air when the moisture concentration of the air reaches the critical humidity of the urea. As the temperature of urea goes up, its critical humidity goes down. However, my unique invention can be used in urea granulation just as with other hygroscopic compounds as long as the critical humidity of the compound is not exceeded. The critical humidity is determined by the surface temperature of the hygroscopic compound and the moisture content of the air, actual air temperature in the granulator has no effect on the pickup of moisture by the hygroscopic compound unless the humidity of the air is such that atomized water is not evaporating quickly and thus the water as liquid is coming into contact with the hygroscopic material or water is condensing in the air and impinging on the hygroscopic compound. It was pointed out earlier that the removal of the heat of crystallization and associated heat from cooling of the melt and subsequently solid material by water evaporation cooling by my unique invention is a process of indirect heat transfer where water does not come into contact with the granules; therefore, the overall heat transfer rate is the equilibrium transfer rate between the evaporation rate of water to air and the heat transfer rate between air and the granules; then it can be seen that neither of the individual rates nor the overall rate is affected unless the critical humidity or dew point of the air is reached. Using the equipment of Example I, supra, urea melt at 300° F. is sprayed on the falling cascade with a spraying pressure of 250 psig and an overall rate of 698 pounds per hour. Cooling air enters at 84° F. and between 400 and 600 acfm. Water is not atomized in the drum until the urea being sprayed on the recycle has raised the granule temperature to 190° F. where moisture concentration in the air must be 0.459 pound per $H_2O$ per pound of dry air before water absorption will take place. The molten urea is continually sprayed on the granules as they pass through the drum but care is taken to prevent the granule temperature from falling below the temperature at which its surface reaches the level where moisture pickup can begin based on the humidity of the air with which it is in contact. For good urea solidification, the granules should not be allowed to exceed 220° F. Water atomization is controlled at or below a median particle diameter of 50 to 60 microns and is sprayed at the rate of 70.7 pounds per hour. Urea granules of −8 mesh are continuously metered into the granulating drum at 13.4 pounds per hour to provide seed for granulation. The granulated urea discharges from the drum at 190° F. and at a rate of 1011 pounds per hour. After screening the product out, the undersize urea is fed back to the granulator at 160° F. (although no external cooling is required by this process) at the rate of 299 pounds per hour. It is calculated that 108,400 Btu's per hour are removed from the molten urea in granulation of it and that 76,000 Btu's per hour are removed by evaporating water. The resulting product shows no increase in moisture content over that normally obtained in pan or drum granulation of urea by the present art.

Granulation pans and drums are of various sizes and internal design, and operate under different loadings, rotational speeds, and angles of inclination. Maximum temperature differentials allowable in a granulation or coating process are different based on the materials being processed and the desired physical characteristics of the final product. Therefore, it is impossible to specify the degree of atomization needed in every application of my invention. However, based on my experinental work, it appears that the evaporation time of the water droplets should be no more than 2 seconds and preferably no more than 1 second in most applications or the moisture will have time to contact and condense on the granules or an internal granulator surface, and droplets should be atomized in a soft spray in a subtended angle of 30 degrees or more to a median size diameter of 60 microns or less. Slight variations from these findings to fit specific granulator applications should not be considered a departure from the spirit of my unique invention.

After sifting and winnowing through the data presented above as well as other data available to me, I have determined the maximum, minimum and typical values for the functions of the process as represented in equation 19. These are summarized below for the granulation of sulfur and for the granulation of urea.

Process for the Removal of the Heat of Crystallization and Associated Heat from Cooling of the Melt and Subsequently Solid Material in Melt Granulators by the Rapid Evaporation of Water Mist

| Process variables | Sulfur Minimum | Sulfur Typical | Sulfur Maximum | Urea Minimum | Urea Typical | Urea Maximum |
|---|---|---|---|---|---|---|
| Average radius of an evaporating drop over its life span, $\bar{r}$, microns or (304,800 × ft) | a | 16.67 | 20 | a | 16.67 | 20 |
| Number of water droplets present in atomized form at any given time, $n/V_g$, droplets/ft$^3$ of granulator | b | $1.4 \times 10^6$ | c | b | $1.6 \times 10^6$ | c |
| Average temp. of the granules in contact with the air, $t_g$, °F. | 110 | 163 | 202 | 130 | 190 | 220 |
| Average dry bulb temp. of the air in the granulator, $t_a$, °F. | 80$^d$ | 112 | 190 | 80$^d$ | 115 | 210 |
| Average wet bulb temp. of the air in the granulator, $t_w$, °F. | 60$^d$ | 101 | 183 | 60$^d$ | 105 | 144 |
| Average thermal conductivity of air in granulator, $k_f$, Btu-ft/(ft$^2$) (hr.) (°F.) | 0.0147$^d$ | 0.0157 | 0.0176 | 0.0147$^d$ | 0.0158 | 0.0170 |
| Average forced thermal convection of air in contact with the water droplets, $k_c$, Btu-ft/(ft$^2$) (hr.) (°F.) | e | 0.048 | e | e | 0.048 | e |
| Ratio of air flowing through granulator, $W_a/W_v$, lb of dry air/lb of H$_2$O sprayed | 1.32 | 45.2 | f | 5.59 | 35.5 | f |
| Change of enthalpy of the entering air as it passes through the granulator $\Delta H_a$, Btu/lb of dry air | 0$^g$ | 6.97 | ≈38 | 0$^g$ | 7.72 | ≈38 |
| Rate of water evaporated, $W_v/V_g$, lb/ (hr.) (ft$^3$ of granulator) | h | 0.737 | 3 | h | 0.938 | 4 |
| Average change in enthalpy of the water evaporated after it is in the vapor phase, $\Delta H$, Btu/lb of H$_2$O | 1.3 | 4.7 | 54 | 1.3 | 4.3 | 61.7 |
| Average heat transfer coefficient between granules and air, $h_g$, Btu/(ft$^2$) (hr) (°F.) | i | 16.3 | i | i | 11.8 | i |
| Average number of granules exposed to air at any instant, $N_g/V_g$, granules/ft$^3$ of granulator | i | $8.0 \times 10^3$ | i | i | $2.0 \times 10^4$ | i |
| Average surface area exposed on each granule, $A_g$, ft$^2$/granule | i | $1.15 \times 10^{-4}$ | i | i | $5.7 \times 10^{-5}$ | i |
| Volume of granulator, $V_g$, ft$^3$ | 25 | 1410 | 35,000 | 25 | 1570 | 35,000 | a No minimum value, the smaller the size of the droplet, the better.
b No minimum value, usefulness of the process decreases with number of droplets.
c No maximum, since a function of $\bar{r}$ minimum
d Lowest practical value.
e Value depends on granulator characteristics.
f No maximum, but usefulness of process decreases with increasing value.
g Case where air is not heated in passing through granulator.
h No minimum, but usefulness of process decreases as spray rate approaches zero.
i Undetermined, value varies with size of granules, and size and type of granulator.

While I have described and shown particular embodiments of my invention, modifications and variations thereof will occur to those skilled in the art. I wish it to be understood that the appended claims are intended to cover such modifications and variations which are within the true scope and spirit of my invention.

What I claim as new and desire to secure by Letters Patent of the United States is:

1. In an improved process for the granulation of materials wherein same is effected in an enclosed vessel by spraying particles of molten material on rapidly moving granules of substrate such that the granules of substrate are increased in size by accretion as the sprayed particles solidify quickly on the surface of said substrate, and wherein at least a substantial amount of the heat of crystallization and associated heat from cooling the molten material and subsequently solid material is removed by evaporation of water in said enclosed vessel into air being moved through said enclosed vessel, the improvement in combination therewith which comprises the additional steps of:

(1) atomizing the water to be evaporated in said enclosed vessel into finely divided droplets having a median volume diameter of less than $1.967 \times 10^{-4}$ ft;

(2) spraying said water droplets with a spray angle, the arc of which is at least 30 degrees;

(3) spraying said water droplets in such a manner that the liquid water comprising same totally evaporates while in said air in a period of time of less than 2 seconds and from a predetermined juxtaposed position such that no water in the liquid phase contacts either the sprayed particles of molten material or of the substrate granules which are increasing in size by accretion from the solidification of said sprayed particles of molten material, or both;

(4) controlling the moisture content of said air below the dew point of said air everywhere in said enclosed vessel, below the concentration in said air where condensation would take place on any surface inside said enclosed vessel, and below the concentration in said air where granules of substrate of any size or at any point in said enclosed vessel would absorb water from said air, thus preventing water absorption by said granules of substrate and condensation of water in the air onto the inner surfaces of said enclosed vessel; and (5) removing said heat of crystallization and associated heat from cooling the molten material and subsequently solid material by evaporation of said finely divided droplets of water to give an overall heat transfer rate which is represented in Btu/hr by either the numerator or denominator of the following equation which represents the thermodynamics of the instant process, i.e.

$$\frac{4\pi \bar{r} n(t_a - t_w)(k_f + k_c) + W_a \Delta H_a + W_v \Delta H_v}{h_g N_g A_g (t_g - t_a) + q_i} = 1$$

where $\pi$ is the ratio of the circumference of a circle to its diameter and is 3.1416 and dimensionless; $\bar{r}$ is the average radius in ft. of an evaporating droplet over its life span and is a maximum of $6.56 \times 10^{-5}$ ft; n is the number of water droplets present in atomized form in the vessel at a given instant and as such is dimensionless; $t_a$ is the average dry bulb temperature of the air in °F.; $t_w$ is the average wet bulb temperature of the air in °F.; $t_g$ is the average temperature of granules in contact with the air in °F.; $k_f$ is the thermal conductivity of the air in Btu-ft/(hr)(ft$^2$)(°F.); $k_c$ is the forced thermal convection of air in contact with water droplets in Btu-ft/(hr)(ft$^2$)(°F.); $W_a$ is the mass flow rate of air through the vessel less water evaporated in the vessel in lb/hr; $\Delta H_a$ is the difference in enthalpy of the air entering and leaving the vessel less water evaporated in the vessel in Btu/lb; $W_v$ is the mass flow rate of water sprayed and evaporated in the vessel in lb/hr; $\Delta H_v$ is the average change in enthalpy of the water evaporated in the vessel after it is in the vapor phase in Btu/lb; $h_g$ is the average heat transfer coefficient between granules and air in Btu/(ft$^2$)(hr)(°F.); $N_g$ is the number of granules exposed to the air at any one instant and is dimensionless; $A_g$ is the average surface area of each one of those granules exposed to the air in square feet; and $q_i$ is the rate of heat flow from granules to the air by indirect means in Btu/hr, and where the lefthand term of the numerator fully describes the rate of heat transfer by evaporation of water in Btu/hr, and the middle and righthand terms of the numerator fully describe the heat absorbed by the air and the water vapor, respectively, in Btu/hr, and the denominator fully describes the rate of heat transfer from granules to air in Btu/hr.

2. The process of claim 1 wherein said enclosed vessel is a rotating cylindrical drum.

3. The process of claim 2 wherein said rotating cylindrical drum is equipped with lifting flights.

4. The process of claim 3 wherein said rotating cylindrical drum equipped with lifting flights is equipped with deflector means, said deflector means positioned within the confines of said drum and being of a length substantially equal to the length of said drum and in a plane substantially parallel with the axis of said drum, and a substantial portion of said plane located horizontally above said drum axis.

5. The process of claim 4 wherein the molten material is sulfur and where $t_g$ is between 110° F. and 202° F.; $t_a$ is between 80° F. and 190° F.; $t_w$ is between 60° F. and 183° F.; $k_f$ is between 0.0147 and 0.0176 Btu-foot per square foot per hour per °F.; $k_c$ is approximately 0.048 Btu-ft/ft$^2$(hr)(°F.); $W_a/W_v$ is between 1.32 and 300 lb of dry air/lb of water sprayed; $W_v/V_g$ is between 0.1 and 3 pounds per hour per cubic foot of vessel; $V_g$, which is the volume of the vessel, is between 25 and 10,000 cubic feet; $\Delta H_a$, which is the change in enthalpy of the entering air as it passes through the granulator is less than about 38 Btu per pound of dry air; $\Delta H_v$, which is the average change in enthalpy of the water evaporated after it is in the vapor phase ranges from about 1.3 to about 52 Btu/lb water; and n, which is the number of droplets, is between about $3.5\times10^7$ to about $1.4\times10^{10}$.

6. The process of claim 4 wherein the molten material is urea and where $t_g$ is between 130° F. and 220° F.; $t_a$ is between 80° F. and 210° F.; $t_w$ is between 60° F. and 144° F.; $k_f$ is between 0.0147 and 0.0170 Btu-foot per square foot per hour per °F.; $k_c$ is approximately 0.048 Btu-ft/ft$^2$(hr)(°F.); $W_a/W_v$ is between 5.59 and 300 lb of dry air/lb of water sprayed; $W_v/V_g$ is between 0.1 and 4 pounds per hour per cubic foot of vessel; $V_g$, which is the volume of the vessel, is between 25 and 10,000 cubic feet; $\Delta H_a$, which is the change in enthalpy of the entering air as it passes through the granulator is less than about 38 Btu per pound of dry air; $\Delta H_v$, which is the average change in enthalpy of the water evaporated after it is in the vapor phase ranges from about 1.3 to about 61.7 Btu/lb water; and n, which is the number of droplets, is between about $4\times10^7$ to about $1.6\times10^{10}$.

7. The process of claim 1 wherein the substrate upon which the sprayed molten material is directed in said enclosed vessel is a material of substantially different chemical makeup from said sprayed molten material such that it is a coating process.

* * * * *

UNITED STATES PATENT AND TRADEMARK OFFICE
CERTIFICATE OF CORRECTION

PATENT NO. : 4,213,924
DATED : July 22, 1980
INVENTOR(S) : Arthur R. Shirley, Jr.

It is certified that error appears in the above-identified patent and that said Letters Patent are hereby corrected as shown below:

Column 8, formula (8) should read as follows: --

$$\sum_{1}^{n} -dw_n/d\theta = \frac{n^{2/3} 4\pi k_f r_1 (t_a - t_w)}{\lambda}$$

Column 9, formula (18), directly under "Heat from solidification and cooling of melt," change to -- $h_g N_g A_g (t_g - t_a) + q_i$ --

Signed and Sealed this

Fourteenth Day of October 1980

[SEAL]

Attest:

SIDNEY A. DIAMOND

Attesting Officer

Commissioner of Patents and Trademarks